Figure 1:
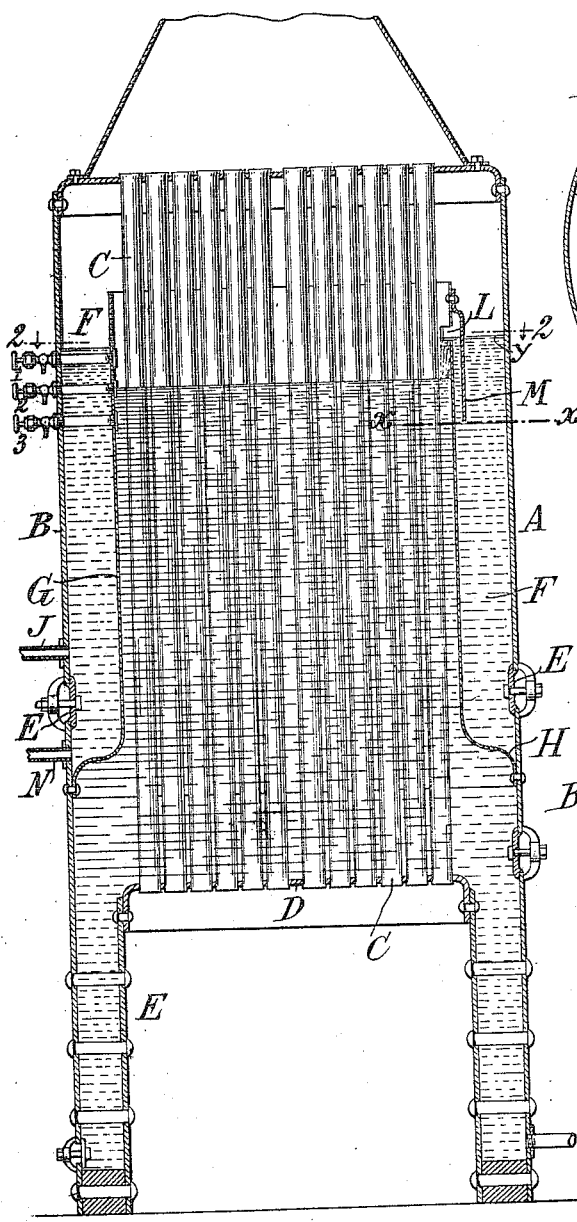

T. T. PARKER.
BOILER.
APPLICATION FILED JUNE 13, 1910.

994,655.

Patented June 6, 1911.
2 SHEETS—SHEET 1.

WITNESSES:
Fred White
Rene' Muine

INVENTOR:
Thomas T. Parker,
By Attorneys,
Fraser Turk & Myers

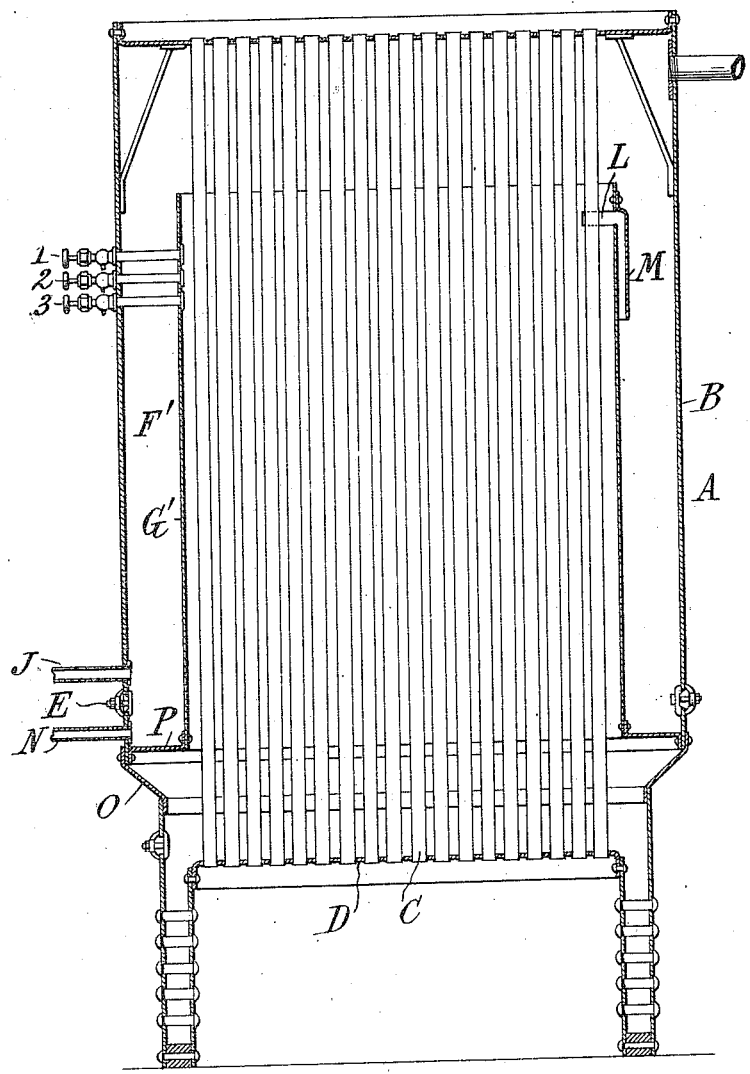

UNITED STATES PATENT OFFICE.

THOMAS T. PARKER, OF HACKENSACK, NEW JERSEY.

BOILER.

994,655.

Specification of Letters Patent. Patented June 6, 1911.

Application filed June 13, 1910. Serial No. 566,568.

*To all whom it may concern:*

Be it known that I, THOMAS T. PARKER, a citizen of the United States, residing in Hackensack, in the county of Bergen and State of New Jersey, have invented certain new and useful Improvements in Boilers, of which the following is a specification.

This invention relates to steam boilers and aims to provide certain improvements therein.

The principal object of the present invention is to prevent the formation of scale in boilers, especially of the vertical type, and the accumulation of other solids upon the tube sheet or other fire-swept surfaces. Numerous attempts have been made to accomplish a like result, but these have been only partially successful.

In the operation of a boiler the incoming feed water which is usually heated in a preliminary way is rapidly raised to such a temperature that the solids are liberated. If the feed water is directly introduced into the tube system it speedily reaches a temperature at which its ebullition takes place, and a part of the solids are carried up to the top of the boiler. A certain proportion of these eventually find their way to the bottom surfaces and others become attached to the fire-swept surfaces in the form of scale. Light and flocculent substances such as oils or some of the lighter solids retain their position at the top of the boiler for a considerable time. It has heretofore been proposed to feed the water into a small compartment before passing it to the heating surfaces of the boiler with the idea that all of the solids will be removed from the water actually fed to the boiler by a process of sedimentation. This construction has not been successful for the reason that the solids contained in the water are not given an opportunity to sink to the bottom but are carried over the top of the compartment without being deposited. A further objection to such a construction is that the lighter matters in suspension will not sink to the bottom, and hence are carried into the boiler proper.

According to my invention I provide within the boiler a large chamber which is preferably circular and preferably entirely surrounds the bank of tubes. The inside shell of this chamber is exposed on its inner surface to the heat of the boiler water, and is thereby heated to a high heat, which heat is transmitted to the water contained in the chamber. By this means the water in the chamber becomes highly heated and effects the liberation of the solids in suspension. The capacity of the chamber is so large that a given body of water passes through it slowly and thus permits the precipitation of the heavier solids of which a large part sink to the bottom of the chamber. A large part of the solids are carried upwardly by the ebullition of the water and rise to the surface, although eventually they find their way to the lower part of the chamber. The lighter matters such as oil and other substances which have not sufficient specific gravity to sink also collect in the upper part of the chamber at or near the surface thereof. If these substances were permitted to enter the boiler proper, they would cause a very deleterious effect upon the latter.

According to my invention I provide means for preventing the entrance of such lighter substances into the boiler proper. The means I prefer to employ in this connection are adapted to feed the water from the chamber into the boiler at a point which is a considerable distance below the surface of the water in the chamber. Stated in other words, the wall of the separating chamber extends beyond the normal water line of the boiler proper so that the water in the chamber does not flow over the top into the tube chamber, but is drawn into the latter through an opening or openings below the top. By these means I am enabled to prevent the entrance of a very large proportion of impurities into the boiler proper. The sedimentation chamber is preferably provided with hand-holes through which the deposited sedimentation may be withdrawn. Furthermore, the chamber may be blown out by interior steam pressure, so as to entirely clean it while the boiler is in operation. The construction provided by my invention prevents to a very large degree the formation of incrustations upon the boiler tubes and the deposit of sediment upon the tube plate. These latter deposits are especially dangerous since the tube plate being exposed to the fire and no longer having the cooling effect of the water blows out very rapidly. Moreover, the passage of oily substances into contact with the tubes and other fire-swept surfaces is prevented, and this active source of danger is avoided.

Figure 2:
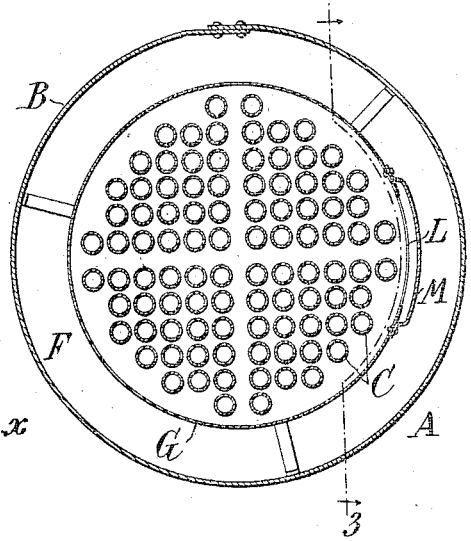
Figure 3:
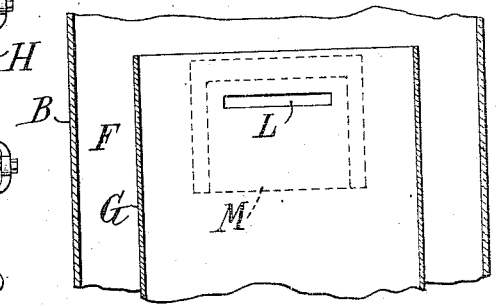

Referring to the drawings which illustrate several embodiments of the invention,—Figure 1 is a central vertical section of a vertical tube boiler embodying the invention. Fig. 2 is a horizontal section of Fig. 1 taken on the line 2—2. Fig. 3 is a detail view showing the inside of a portion of the feed water chamber. Fig. 4 is a central vertical section of a modified form of water tube boiler showing my invention applied thereto.

Referring first to the embodiment of the invention illustrated in Fig. 1, let A indicate the boiler as a whole having an external shell B and a bank of tubes C. The latter are shown as mounted upon a tube plate D forming the upper wall of the fire box E. These parts may be of any usual construction.

Within the boiler shell B I provide a separating chamber F which may be constructed in any suitable manner, preferably by a cylindrical shell G which is enlarged at its lower end H where it is connected by rivets or otherwise to the shell B. The particular formation of this chamber is not essential to the invention, but it should be closed at its lower end and preferably open at its upper end. It is essential to this feature of the invention, however, that the well or chamber F be of large capacity, and to this end I preferably form the chamber entirely around the boiler, so that the greatest possible capacity is obtained consistent with the size of the boiler. Into this chamber the feed water is led preferably through a pipe J located at one side of the chamber, and preferably near the bottom thereof. As the cylinder G forming the inner wall of the well is exposed on its inner side to the heat of the boiler water, it becomes highly heated and transmits its heat to the feed water in the chamber F. The latter hence becomes highly heated, and most of the solids or other foreign substances within the water begin to separate out. By reason of the large capacity of the chamber, the feed water moves comparatively slowly through it, and sedimentation, which would be impossible in a small chamber, takes place actively, so that a large percentage of the heavy solids are precipitated out and fall to the bottom of the chamber. Under these circumstances if the water is then fed to the boiler, it reaches the latter in a greatly purified state, and is comparatively free from deleterious substances.

The lighter substances contained in the feed water which either would not sink at all, such as oils, etc., or which require a considerable time to become precipitated, would, if the feed were taken from the surface of the feed water, overflow into the boiler, and become a source of serious danger to the structure.

An important feature of my invention therefore consists in means for avoiding the ingress of these substances into the boiler proper. The means which I prefer to employ for this purpose comprise a means for trapping the floating substances or a large proportion thereof so that they will not overflow into the boiler proper. The simplest and the most effective manner of accomplishing this result consists in drawing the feed water into the boiler proper from a point well below the surface of the feed water, and hence below the aggregation of floating substances.

In the drawings I have illustrated the usual series of gage cocks 1, 2 and 3 which pass through the separating chamber F and are in communication with the tube chamber. According to usual practice the engineer will maintain his boiler water at or about the level of the gage cock 2, and this may be considered as the normal water line of the tube chamber. At a point in the wall G of the well F, just below the top of the latter, I locate a feed opening L which is shown as an elongated slot of considerable dimensions for securing the necessary feed. From this opening I preferably provide a conduit extending to a point below the same. Preferably the conduit is formed as a hood M arranged around the opening L, the upper sides of the hood being connected to the wall G with a leak-tight joint while end and sides of the hood being connected to the wall G with a leak-tight joint while the lower end of the hood is open as shown. Hence the water which is fed to the tube chamber is withdrawn from the latter at the line $x\ x$, Fig. 1. In order to feed through the slot L, it is necessary that the level of the water in the well F shall reach the level $y$ so that it may overflow through the slot L. Hence it will be seen that the lighter or floating substances will lie well above the point $x\ x$, and will be trapped out of the tube chamber so that they do not enter the latter. That proportion of the floating substances which eventually sink will deposit themselves at the bottom of the well, while when there is a sufficient aggregation to warrant it, the engineer will blow out the well through the pipe N or clean it out through the hand-hole E. It will be observed that in order to blow out the boiler, it is not necessary to disturb the boiler water so that the boiler may be effectually cleaned while in operation.

An important feature of the invention is the location of the feed-opening L at a point which is remote in the travel of the water from the ingress pipe. I have shown this at a point which is substantially opposite to the ingress pipe, so that the water necessarily has to travel completely around the chamber in order to reach the feeding point. With a chamber of the dimensions shown the passage of the water is so slow that it becomes highly heated, thus facilitating the liberation of the solids and also giving sufficient time to permit the heavier solids to precipitate and the lighter solids to rise. When the boiler is in operation the engineer will maintain the boiler water level at approximately the level of the gage cock 2 and the feed water at approximately the level of the opening L. No particular disadvantage, however, will occur if these levels are materially altered.

In Fig. 4 I have illustrated the invention as applied to another form of vertical boiler. In this construction an outwardly extending ogee plate O is substituted for the inwardly extending breast plate now usually employed, thus giving abundant room for the feed water chamber F'. A shell or inner wall G' is fastened to an annular plate P in such manner that a leak-tight joint is maintained. In other respects the construction does not differ materially from that already described with reference to Figs. 1 and 2.

In both of the constructions shown it will be observed that a considerable section of the upper part of the bank of tubes is not in contact with the boiler water, and hence forms a very effectual super-heating system whereby the steam generated can be raised to any desired temperature within the capacity of the boiler.

I am aware that it has been proposed to construct a separating chamber, the bottom of which is formed by a portion of the tube sheet or upper wall of the fire-box. But in this case when a substantial layer of sediment is formed in the bottom of the chamber, the tube sheet being no longer adequately cooled by the fluid above, soon burns out. This is apt to occur more quickly in such construction than would be the case if the sedimentation chamber were omitted, since the sediment, being localized in the bottom of the chamber, increases in thickness more rapidly than if it were distributed over the entire area of the tube sheet. According to my invention the bottom of the separating chamber is separated from the walls of the tube sheet or fire-box of the boiler, and is fluid-cooled, preferably by the boiler water as shown. Hence no accumulation of sediment in the bottom of the chamber has any effect to destroy the sheet.

It will be understood that while I have shown in detail several embodiments of my invention that I do not wish to be limited thereto, as various changes may be made therein without departing from the spirit of the invention. It will also be obvious that automatic means may be provided for feeding the water into the chamber F or from the chamber F into the tube chamber, and that in place of the gage cocks any other suitable indicating means may be provided. It will also be observed that other means than that shown may be employed for trapping out the floating substances.

What I claim is:—

1. In a vertical steam boiler, the combination of a boiler proper, a sedimentation chamber extending around the boiler, the bottom of said chamber being separated from the walls of the fire-box of the boiler, and being fluid cooled, means for feeding water to said chamber, means near the top of said chamber for feeding water from said chamber to said boiler, said chamber being of relatively large capacity whereby the feed water travels through said chamber at a sufficiently low rate of speed to permit precipitation of solids therein.

2. In a vertical tube steam boiler, the combination of a tube boiler and a sedimentation chamber extending around said tube boiler the bottom of said chamber being separated from the walls of the fire-box of the boiler, and being fluid cooled, means for introducing feed water into said separating chamber, and means near the top of said chamber for feeding water from said chamber to the tube boiler, said separating chamber being of relatively large capacity whereby the feed water travels through said chamber at a sufficiently low rate of speed to permit precipitation of solids therein.

3. In a vertical steam boiler, the combination of a boiler, a sedimentation chamber extending around the boiler, and exposed to water on its under side, means for feeding water to said chamber, means near the top of said chamber for feeding water from said chamber to said boiler, said chamber being of relatively large capacity whereby the feed water travels through said chamber at a sufficiently low rate of speed to permit precipitation of solids therein, said means for feeding water to said boiler being located at a point remote in the travel of the water from said means for feeding water to said chamber.

4. In a vertical steam boiler, the combination of a boiler, a sedimentation chamber extending around the boiler and exposed to water on its under side, means for feeding water to said chamber, means near the top of said chamber for feeding water from said chamber to said boiler, said chamber being of relatively large capacity whereby the feed water travels through said chamber at a sufficiently low rate of speed to permit precipitation of solids therein, said means for feeding water to said chamber and said means for feeding water from said chamber to said boiler being located approximately on opposite sides of the boiler.

5. In a vertical tubular steam boiler, the combination of a boiler proper, having a series of fire tubes, and a sedimentation chamber extending around said boiler proper and exposed to water on its under side, means for introducing feed water into said chamber, and means near the top of said chamber for feeding water from said chamber to the boiler proper, said chamber being of relatively large capacity whereby the feed water travels through said chamber at a sufficiently low rate of speed to permit precipitation of solids therein, said means for introducing water to said chamber and said means for feeding water from said feed chamber to said tube chamber being located approximately on opposite sides of the boiler.

6. In a vertical boiler, the combination of a fire box, a tube sheet, a series of vertical fire tubes connected with said tube sheet, a wall surrounding said tube sheet and constituting within it a tube chamber and spaced apart from the boiler shell to form a sedimentation chamber, the walls of said chamber being separated from said fire box by a passage into which the boiler water can enter, means for introducing water to said feed water chamber, and means near the top of said feed water chamber for feeding water from said chamber to said tube chamber, said feed water chamber being of relatively large capacity and substantially surrounding said tube chamber whereby the feed water travels so slowly through said chamber as to precipitate solids therefrom.

7. In a boiler, the combination of a boiler proper, a feed water chamber, means for feeding water from the upper part of said chamber into said boiler proper, and means for preventing the ingress into said boiler proper of floating substances contained in said feed water chamber.

8. In a boiler, the combination of a boiler proper, a sedimentation chamber, and means for feeding water from the upper part of said chamber into said boiler proper, said means leading the water from a point below the level of the water in said chamber, whereby to avoid the entrance of flocculent matter into the boiler.

9. In a boiler, the combination of a boiler proper, a sedimentation chamber, and a passage between said chamber and boiler proper, said passage being located below the top of said chamber, and means for causing a flow of water through said passage from said chamber to said boiler proper whereby to avoid the entrance of flocculent matter into the boiler.

10. In a boiler, the combination of a boiler proper, a sedimentation chamber, and a passage between said chamber and said boiler proper, said passage being located below the top of said chamber, a conduit in connection with said passage leading to a point below the same, and means for causing an upward flow of water through said conduit to said boiler proper.

11. In a boiler, the combination of a boiler proper, a sedimentation chamber, a passage between said chamber and said boiler proper, a hood extending around said passage and opening below the same, and means for causing an upward flow of water through said hood to said boiler proper.

12. In a boiler, the combination of a series of tubes, a sedimentation chamber extending around said tubes, and means for feeding water from the upper part of said chamber downwardly around said tubes, said means being located below the surface of the water in said chamber, and being adapted to oppose the passage of floating substances from said sedimentation chamber to the space around said tubes.

13. In a boiler, the combination of a series of tubes, a relatively large feed water chamber extending around said tubes, means for admitting feed water to said feed water chamber on one side of the latter, and means for feeding water from the upper part of said feed water chamber downwardly around said tubes, said last-named means being located approximately on the opposite side of the boiler, and being adapted to feed water from said feed water chamber at a point below the level of the water in the latter.

14. In a vertical boiler, the combination of a series of tubes, a feed water chamber extending substantially around said series of tubes, means for feeding water into said feed water chamber, and means for feeding water from the upper part of said feed water chamber downwardly to said tubes from a point below the level of the water around said feed water chamber, said feed water chamber being of relatively large capacity whereby the feed water travels so slowly therethrough as to permit precipitation of solids therein.

15. In a boiler, the combination of a boiler proper, a feed water chamber, means tending to prevent any substantial circulation of water from said boiler proper into said feed water chamber, means for permitting the passage of feed water from said chamber to said boiler proper, and means tending to prevent the passage of floating substances from said chamber to said boiler proper.

16. In a boiler, the combination of a boiler proper, a feed water chamber, means tending to prevent any substantial circulation of water from said boiler proper into said feed water chamber, and means for feeding water to said boiler proper from said chamber from a point below the surface of the water in said chamber, whereby to oppose entrance of floating substances into said boiler proper.

17. In a boiler, the combination of a boiler proper, a feed water chamber, means tending to prevent any substantial circulation of water from said boiler proper into said feed water chamber, and a passage between said chamber and said boiler proper located below the top of said chamber, whereby to oppose entrance of floating substances into said boiler proper.

18. In a boiler, the combination of a boiler proper, a feed water chamber, means tending to prevent any substantial circulation of water from said boiler proper into said feed water chamber, a passage between said chamber and said boiler proper located below the top of said chamber, and a conduit within said feed water chamber in connection with said passage and leading to a point below the same.

19. In a vertical boiler, the combination of a boiler proper, a feed water chamber extending around said boiler proper and having a wall separating it therefrom, said wall extending above the high water level in said boiler proper, whereby substantial circulation from said boiler proper to said chamber is prevented, means for feeding water from said chamber to said boiler proper, and means tending to prevent ingress of floating substances from said chamber to said boiler proper.

20. In a vertical boiler, the combination of a boiler proper, a feed water chamber extending around said boiler proper and having a wall separating it therefrom, said wall extending above the high water level in said boiler proper, whereby substantial circulation from said boiler proper to said chamber is prevented, means for feeding water from said chamber to said boiler proper from a point below the level of water in said chamber, and means tending to prevent ingress of floating substances from said chamber to said boiler proper.

21. In a vertical boiler, the combination of a boiler proper, a feed water chamber extending around said boiler proper and having a wall separating it therefrom, said wall extending above the high water level in said boiler proper whereby substantial circulation from said boiler proper to said chamber is prevented, a passage trapped between said chamber and boiler proper located below the top of said wall, and a trap for said passage in said feed water chamber.

22. In a vertical boiler, the combination of a boiler proper, a feed water chamber extending around said boiler proper and having a wall separating it therefrom, said wall extending above the high water level in said boiler proper whereby substantial circulation from said boiler proper to said chamber is prevented, a passage between said chamber and boiler proper located below the top of said wall, and a conduit in said feed water chamber in connection with said passage and leading to a point below the same.

23. In a vertical boiler, a series of substantially vertical tubes constituting the boiler proper, a feed water chamber surrounding the same and having a wall separating said chamber therefrom, means for feeding water from the upper part of said chamber to said boiler proper, said wall being imperforate from said means downwardly, and means tending to prevent passage of floating substances through said feeding means to said boiler proper.

24. In a vertical boiler, a series of substantially vertical tubes constituting the boiler proper, a feed water chamber surrounding the same and having a wall separating said chamber therefrom, means for feeding water from the upper part of said chamber to said boiler proper, said wall being imperforate from said means downwardly, and means tending to prevent passage of floating substances through said feeding means to said boiler proper, said means extending to a point below the surface of the water in said chamber.

25. In a vertical steam boiler, the combination of a series of tubes, a tube sheet therefor, and a sedimentation chamber extending around said tubes, said sedimentation chamber being arranged above said tube sheet with its lower wall spaced apart therefrom, and said boiler being constructed to provide a clear space between said sedimentation chamber and tube sheet whereby to permit access to and inspection of the upper wall of said sheet.

26. In a vertical steam boiler, the combination of a series of tubes, a tube sheet therefor, and a sedimentation chamber extending around said tubes, said sedimentation chamber having its lower wall exposed to water on its under side, and said sedimentation chamber being arranged above said tube sheet with its lower wall spaced apart therefrom, and said boiler being constructed to provide a clear space between said sedimentation chamber and tube sheet whereby to permit access to and inspection of the upper wall of said sheet.

27. In a vertical steam boiler, the combination of a series of tubes, a tube sheet therefor, and a sedimentation chamber extending around said tubes, said sedimentation chamber having its lower wall exposed to water on its under side, and said sedimentation chamber being arranged above said tube sheet with its lower wall spaced apart therefrom, means for feeding water from said chamber to said boiler, said chamber being of relatively large capacity whereby the feed water travels through said chamber at a sufficiently low rate of speed to permit precipitation of solids therein.

In witness whereof, I have hereunto signed my name in the presence of two subscribing witnesses.

THOMAS T. PARKER.

Witnesses:
EUGENE E. MYERS,
FRED WHITE.

Copies of this patent may be obtained for five cents each, by addressing the "Commissioner of Patents, Washington, D. C."